(12) United States Patent
Bantoft et al.

(10) Patent No.: US 10,993,147 B1
(45) Date of Patent: Apr. 27, 2021

(54) OUT-OF-BAND BANDWIDTH RSVP MANAGER

(71) Applicant: Satcom Direct, Inc., Melbourne, FL (US)

(72) Inventors: Ken Bantoft, Melbourne, FL (US); Pawel Pastuszak, Ottawa (CA); Louis Derrick du Toit, Ottawa (CA)

(73) Assignee: Satcom Direct, Inc., Melbourne, FL (US)

( * ) Notice: Subject to any disclaimer, the term of this patent is extended or adjusted under 35 U.S.C. 154(b) by 0 days.

(21) Appl. No.: 15/053,748

(22) Filed: Feb. 25, 2016

Related U.S. Application Data

(60) Provisional application No. 62/120,581, filed on Feb. 25, 2015.

(51) Int. Cl.
| | |
|---|---|
| *H04W 28/24* | (2009.01) |
| *H04W 72/04* | (2009.01) |
| *H04W 72/08* | (2009.01) |
| *H04W 28/26* | (2009.01) |
| *H04W 40/12* | (2009.01) |

(52) U.S. Cl.
CPC ......... *H04W 28/24* (2013.01); *H04W 28/26* (2013.01); *H04W 40/12* (2013.01); *H04W 72/048* (2013.01); *H04W 72/087* (2013.01)

(58) Field of Classification Search
None
See application file for complete search history.

(56) References Cited

U.S. PATENT DOCUMENTS

| | | | |
|---|---|---|---|
| 4,037,905 | A | 7/1977 | Lucas |
| 5,493,309 | A | 2/1996 | Bjornholt |
| 5,937,349 | A | 8/1999 | Andresen |

(Continued)

FOREIGN PATENT DOCUMENTS

| | | |
|---|---|---|
| JP | 2008287177 | 11/2008 |
| WO | 2007134498 | 11/2007 |

(Continued)

OTHER PUBLICATIONS

Marpe, et al., A Two-Layered Wavelet-Based Algorithm for Efficient Lossless and Lossy Image Compression, IEEE Transactions on Circuits and Systems for Video Technology, 2000, pp. 1094-1102, vol. 10, No. 7.

(Continued)

*Primary Examiner* — Anh Vu H Ly
*Assistant Examiner* — Hector Reyes
(74) *Attorney, Agent, or Firm* — Lowndes; Stephen C. Thomas; Brian S. Steinberger

(57) ABSTRACT

Systems, devices, and methods for a wireless communication reservation bandwidth allocation manager system that includes a device for requesting an out-of-band Quality of Service request following a a set of Application Programming Interfaces for an RSVP. A provider determines if the requested out-of-band Quality of Service is available, a negotiation with a third party service provider for the requested out-of-band Quality of Service, a reservation for the requestor device from the provider when the out-of-band Quality of Service becomes available, and a termination of the reservation when the requesting device notifies the provider that the requested out-of-band Quality of Service is complete.

14 Claims, 5 Drawing Sheets

(56) References Cited

U.S. PATENT DOCUMENTS

| | | | |
|---|---|---|---|
| 5,959,560 A | 9/1999 | Said et al. | |
| 6,014,606 A | 1/2000 | Tu | |
| 6,058,307 A | 5/2000 | Garner | |
| 6,151,497 A | 11/2000 | Yee et al. | |
| 6,173,159 B1 | 1/2001 | Wright et al. | |
| 6,201,797 B1 | 3/2001 | Leuca et al. | |
| 6,400,945 B1 | 6/2002 | Jensen et al. | |
| 6,519,595 B1* | 2/2003 | Rose | H04L 47/10 370/398 |
| 6,529,820 B2 | 3/2003 | Tomescu | |
| 6,732,027 B2 | 5/2004 | Betters et al. | |
| 6,741,841 B1 | 5/2004 | Mitchell | |
| 6,781,968 B1 | 8/2004 | Colella et al. | |
| 6,892,069 B1 | 5/2005 | Flynn | |
| 6,952,645 B1 | 10/2005 | Jones | |
| 6,954,794 B2 | 10/2005 | Rudd et al. | |
| 6,970,704 B2 | 11/2005 | Jensen et al. | |
| 6,978,128 B1 | 12/2005 | Raman et al. | |
| 7,023,365 B1 | 4/2006 | Mitchell et al. | |
| 7,027,898 B1 | 4/2006 | Leger et al. | |
| 7,177,939 B2 | 2/2007 | Nelson et al. | |
| 7,209,978 B2 | 4/2007 | Thubert et al. | |
| 7,225,981 B2 | 6/2007 | Jongebloed | |
| 7,436,762 B2 | 10/2008 | Oka et al. | |
| 7,660,579 B2 | 2/2010 | Jensen | |
| 7,668,632 B2 | 2/2010 | Vian et al. | |
| 7,739,167 B2 | 6/2010 | Breen et al. | |
| 7,761,793 B1 | 7/2010 | Mitchell | |
| 7,852,819 B2 | 12/2010 | Gil et al. | |
| 7,908,077 B2 | 3/2011 | Smith et al. | |
| 8,305,936 B2 | 11/2012 | Wang | |
| 8,339,991 B2 | 12/2012 | Biswas et al. | |
| 8,369,812 B2 | 2/2013 | Lehman | |
| 8,432,808 B1 | 4/2013 | Dankberg et al. | |
| 8,477,771 B2 | 7/2013 | Biswas et al. | |
| 8,527,662 B2 | 9/2013 | Biswas et al. | |
| 8,594,931 B2 | 11/2013 | Sterkel et al. | |
| 8,599,044 B2 | 12/2013 | Maggiore et al. | |
| 8,712,634 B2 | 4/2014 | Followell et al. | |
| 8,762,047 B2 | 6/2014 | Sterkel et al. | |
| 8,989,053 B1 | 3/2015 | Skaaksrud et al. | |
| 9,001,743 B2 | 4/2015 | Alizadeh-Shabdiz | |
| 9,008,868 B1 | 4/2015 | Bantoft et al. | |
| 9,182,231 B2 | 11/2015 | Skaaksrud | |
| 9,182,232 B2 | 11/2015 | Skaaksrud et al. | |
| 9,318,024 B1 | 4/2016 | Natwick et al. | |
| 9,412,278 B1 | 8/2016 | Gong et al. | |
| 9,553,658 B1 | 1/2017 | Bantoft et al. | |
| 9,554,275 B1 | 1/2017 | Bantoft et al. | |
| 9,565,618 B1 | 2/2017 | Bantoft et al. | |
| 9,577,742 B1 | 2/2017 | Bantoft | |
| 9,607,445 B2 | 3/2017 | Jensen et al. | |
| 2002/0111720 A1 | 8/2002 | Holst et al. | |
| 2002/0123915 A1 | 9/2002 | Denning et al. | |
| 2003/0055975 A1 | 3/2003 | Nelson et al. | |
| 2003/0081582 A1* | 5/2003 | Jain | H04B 7/18582 370/338 |
| 2003/0085818 A1 | 5/2003 | Renton et al. | |
| 2003/0093187 A1 | 5/2003 | Walker | |
| 2003/0123481 A1 | 7/2003 | Neale et al. | |
| 2003/0130771 A1 | 7/2003 | Crank | |
| 2003/0217166 A1* | 11/2003 | Dal Canto | H04L 63/0272 709/229 |
| 2003/0225492 A1 | 12/2003 | Cope et al. | |
| 2004/0064588 A1 | 4/2004 | Jungck | |
| 2005/0041859 A1 | 2/2005 | Nguyen et al. | |
| 2005/0053026 A1 | 3/2005 | Mullan et al. | |
| 2005/0083358 A1 | 4/2005 | Lapstun et al. | |
| 2005/0090978 A1 | 4/2005 | Bathory et al. | |
| 2005/0148327 A1 | 7/2005 | Perez et al. | |
| 2005/0177647 A1 | 8/2005 | Anantha et al. | |
| 2005/0187677 A1 | 8/2005 | Walker | |
| 2005/0198271 A1 | 9/2005 | Rubinstein | |
| 2005/0215238 A1 | 9/2005 | Macaluso | |
| 2005/0215249 A1 | 9/2005 | Little et al. | |
| 2005/0220055 A1 | 10/2005 | Nelson et al. | |
| 2005/0244060 A1 | 11/2005 | Nagarajan et al. | |
| 2006/0013264 A1 | 1/2006 | Eichler et al. | |
| 2006/0092897 A1 | 5/2006 | Pirila et al. | |
| 2006/0112119 A1 | 5/2006 | Vian et al. | |
| 2006/0115164 A1 | 6/2006 | Cooley | |
| 2006/0154660 A1 | 7/2006 | Lockridge et al. | |
| 2006/0156357 A1 | 7/2006 | Waugh et al. | |
| 2006/0293049 A1 | 12/2006 | Jensen | |
| 2007/0123290 A1 | 5/2007 | Stenmark | |
| 2008/0036659 A1 | 2/2008 | Smith et al. | |
| 2008/0159158 A1 | 7/2008 | Poisson et al. | |
| 2008/0182573 A1 | 7/2008 | Lauer et al. | |
| 2009/0023403 A1 | 1/2009 | Laberge | |
| 2009/0100179 A1* | 4/2009 | Song | G06F 15/16 709/226 |
| 2009/0109849 A1 | 4/2009 | Wood et al. | |
| 2009/0239475 A1 | 9/2009 | Lehman | |
| 2009/0285153 A1* | 11/2009 | Khan | H04B 7/18506 370/316 |
| 2009/0304096 A1 | 12/2009 | Khattab et al. | |
| 2010/0027461 A1 | 2/2010 | Bothorel | |
| 2010/0035607 A1 | 2/2010 | Horr et al. | |
| 2010/0167723 A1 | 7/2010 | Soumier et al. | |
| 2010/0217458 A1 | 8/2010 | Schweiger et al. | |
| 2010/0279698 A1 | 11/2010 | Wong | |
| 2011/0046842 A1 | 2/2011 | Smith | |
| 2011/0046920 A1 | 2/2011 | Amis | |
| 2011/0063980 A1 | 3/2011 | Kondo | |
| 2011/0114726 A1 | 5/2011 | Porter et al. | |
| 2011/0149849 A1 | 6/2011 | Brownrig | |
| 2011/0255506 A1 | 10/2011 | Toth et al. | |
| 2011/0313614 A1 | 12/2011 | Hinnant, Jr. et al. | |
| 2012/0033851 A1 | 2/2012 | Chen et al. | |
| 2012/0083971 A1 | 4/2012 | Preston | |
| 2012/0109447 A1 | 5/2012 | Yousefi et al. | |
| 2012/0166576 A1 | 6/2012 | Orsini et al. | |
| 2012/0232782 A1 | 9/2012 | Sterkel et al. | |
| 2012/0232791 A1 | 9/2012 | Sterkel et al. | |
| 2012/0303826 A1 | 11/2012 | Nelson et al. | |
| 2013/0103786 A1 | 4/2013 | Miglore | |
| 2013/0120166 A1 | 5/2013 | Kommuri et al. | |
| 2013/0132548 A1* | 5/2013 | Cabos | H04N 21/241 709/223 |
| 2013/0158821 A1 | 6/2013 | Ricci | |
| 2013/0219429 A1 | 8/2013 | Hirsch et al. | |
| 2013/0235728 A1 | 9/2013 | Le et al. | |
| 2013/0283305 A1 | 10/2013 | Hirsch et al. | |
| 2013/0297103 A1 | 11/2013 | Baker et al. | |
| 2014/0024395 A1 | 1/2014 | Johnson et al. | |
| 2014/0045420 A1 | 2/2014 | Tong et al. | |
| 2014/0045520 A1 | 2/2014 | Lim et al. | |
| 2014/0053243 A1 | 2/2014 | Walsh et al. | |
| 2014/0081483 A1 | 3/2014 | Weinmann et al. | |
| 2014/0136658 A1 | 5/2014 | Wahler | |
| 2014/0137162 A1 | 5/2014 | McNamee et al. | |
| 2014/0248588 A1 | 9/2014 | Williams et al. | |
| 2014/0282038 A1 | 9/2014 | Royster et al. | |
| 2014/0315166 A1 | 10/2014 | Williams et al. | |
| 2015/0058184 A1 | 2/2015 | Clark | |
| 2015/0243112 A1 | 8/2015 | Jensen et al. | |
| 2016/0086396 A1 | 3/2016 | Nutaro et al. | |
| 2016/0093217 A1 | 3/2016 | Hale et al. | |
| 2016/0156448 A1 | 6/2016 | Gadat et al. | |
| 2017/0011615 A1 | 1/2017 | Bekanich | |
| 2017/0195483 A1* | 7/2017 | Gault | H04M 3/42289 |

FOREIGN PATENT DOCUMENTS

| | | |
|---|---|---|
| WO | 2008139062 | 11/2008 |
| WO | 2009097042 | 8/2009 |

OTHER PUBLICATIONS

Linux man page, gzip, gunzip, zcat—compress or expand files, 2002, 7 pages.

(56) References Cited

OTHER PUBLICATIONS

Rockwell Collins, EBACE 2012 Press Kit, retrieved on Oct. 4, 2013, retrieved from http://www.rockwellcollins.com/sitecore/content/Data/News/2012_2012_Tr/Cs/FY12CSN . . . , 2 pages.

Vandel, et al., Head-Up Guidance System Technology—A Clear Path to Increasing Flight Safety, Flight Safety Foundation, 2009, 29 pages.

Rockwell Collins, Ascent Mobile Applications, 2012, 2 pages.

Rockwell Collins, Falcon Cabin HD, Elevate your flight experience, 2012, 12 pages.

Rockwell Collins, Pro Line Fusion Advanced Avionics, 2011, 8 pages.

Rockwell Collins, Venue High-Definition Cabin Management System, 2012, 12 pages.

Rockwell Collins, Rockwell Collins to provide advanced cabin management and HD entertainment system for Falcon 7x and Falcon 900LX, News Release, 2012, 1 page.

Rockwell Collins, Jet Aviation St. Louis ti install Rockwell Collins' Venue HD cabin system on a Global Express, News Release, 2012, 2 pages.

Rockwell Collins, Airshow 4000, retrieved on Oct. 4, 2013, retrieved from http://www.rockwellcollins.com/sitecore/content/Data/Products/Cabin/Moving_Map_syst . . . , 2 pages.

Rockwell Collins, Airshow App for Mobile Devices, 2012 4 pages.

Rockwell Collins, Airshow 4000 Version 2, 2013, 9 pages.

* cited by examiner

US 10,993,147 B1

OUT-OF-BAND BANDWIDTH RSVP MANAGER

CROSS REFERENCE TO RELATED APPLICATIONS

This application claims the benefit of priority to U.S. Provisional Application Ser. No. 62/120,581 filed Feb. 25, 2015, the entire disclosure which is incorporated by reference in its' entirety.

FIELD OF INVENTION

This invention relates to wireless communication bandwidth allocation, and in particular to systems, devices, and methods for a mobile application or other external system to request a communications manager or gateway to "reserve" or allocate bandwidth over one or more networks for the purposes of data or voice communications by way of a "preferred" communications channel, where the external system requests, and is then granted or denied the bandwidth, performs communications and then indicates to the system that the communications has been concluded, after which the system stops the preferred communications channel.

BACKGROUND AND PRIOR ART

The invention disclosed herein addresses the problem of indicating to a communications system that an application requires a network connection with specific or improved performance characteristics—Quality of Service. Existing systems are typically focused on in-band requests for preferred communications channels, by flagging IP datagram packets. The invention disclosed here uses out-of-band communications to manage the bandwidth requirements. Thus, the need exists for solutions to the above problems with the prior art systems.

SUMMARY OF THE INVENTION

A primary objective of the present invention is to provide systems, devices, and methods for a mobile application or other external system to request the communications manager or gateway to "reserve" or allocate a bandwidth over one or more networks for the purposes of data or voice communications by way of a "preferred" communications channel.

A second objective of the present invention is to provide systems, devices, and methods for a mobile application or other external system to use an RSVP bandwidth allocation manager system to allocate a bandwidth over one or more networks for purposes of data or voice communications.

A third objective of the present invention is to provide systems, devices, and methods for a mobile application or other external system where the external system requests, and is then granted or denied the bandwidth, performs the communications activities and then indicates to the system that the communications has been concluded, at which point the system stops the preferred communications channel.

The design and function of the RSVP bandwidth allocation manager system of the present invention has not been suggested, anticipated or rendered obvious by any of the prior art references. The RSVP is a request for a response from the invited person or people, and is an acronym for the phrase "Répondez s'il vous plaît" which is sometimes still used in current French to require confirmation of an invitation.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art.

Figure 1:
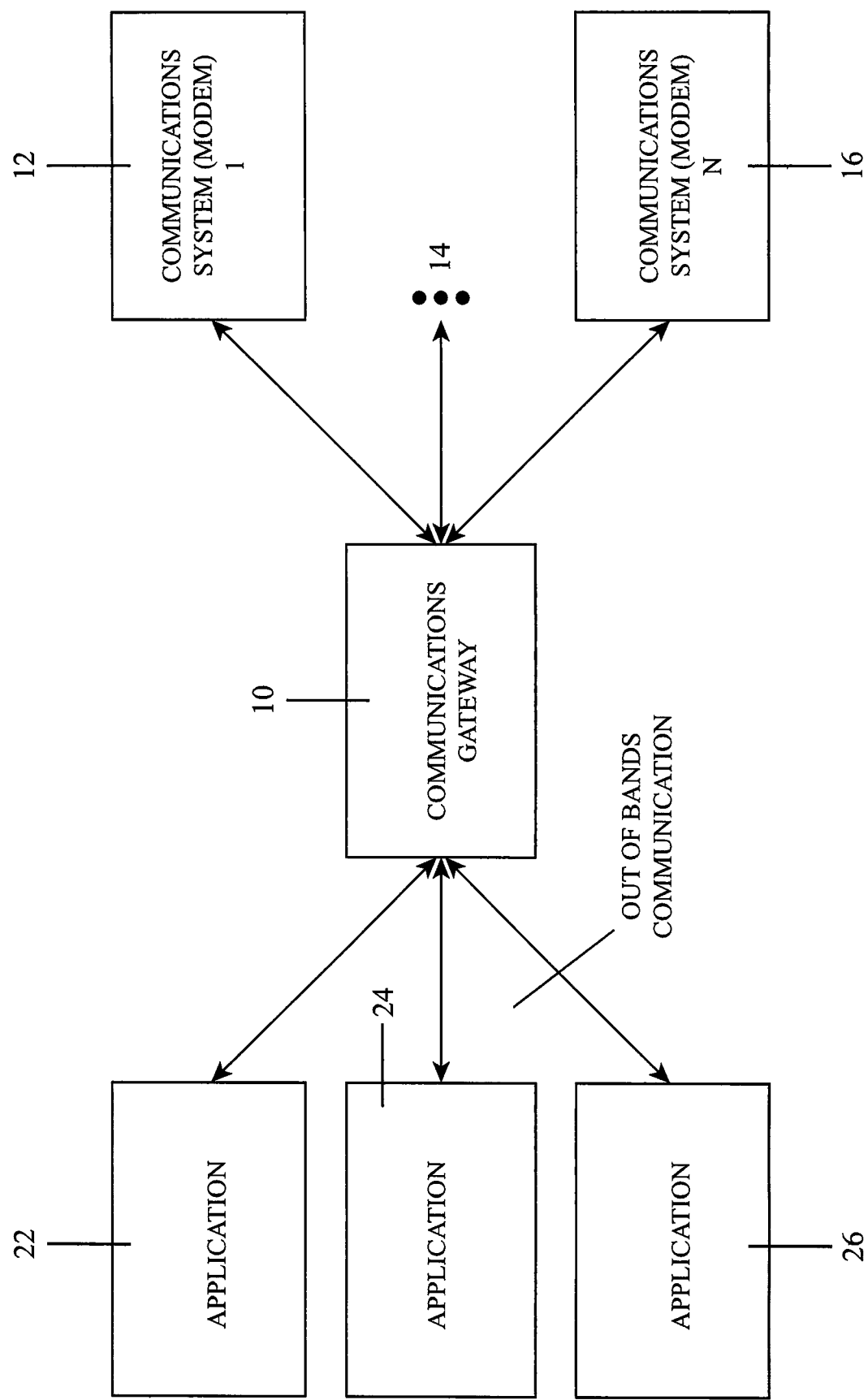
FIG. 1 is a block diagram of a Quality of Service Request.

The systems, devices, and methods of the present invention provide a design and function for an RSVP bandwidth allocation manager system. The system described hereinafter is different from the Resource Reservation Protocol. FIG. 1 is a block diagram of the Quality of Service Request. As shown in FIG. 1, the present invention allows a mobile application on a user personal device, such as but not limited to smart phones, tablets, laptop computers, personal computers, and the like, or other external system to request the communications manager or gateway to "reserve" or allocate bandwidth over one or more networks for the purposes of data or voice communications by way of a "preferred" communications channel". The gateway shown in FIG. 1 can be a router that is acting as a proxy to do channel management.

Every call consumes 16 kbit/sec bandwidth, hence the first call uses 16 kbit/s, second call uses 32 kbit/s, third call uses 48 kbit/s and fourth call uses 64 kbit/s. The external system requests, and is then granted or denied the bandwidth, performs the communications activities and then indicates to the communication system that the communications has been concluded, at which point the system stops the preferred communications channel.

The present invention allows devices to signal out of band (as in, not part of the actual communications stream) their requirements for the network related application. As shown, the system can then "reserve", if available from the network, a connection meeting the preferred Quality of Service for the application.

For example, a passenger on an aircraft using a mobile application on their smartphone submits a request for out-of-band communication to the onboard router (such as a SATCOM DIRECT ROUTER) shown in FIG. 1 as the communication gateway. There can be multiple terminals, also referred to as modems, on the aircraft. The router queries the multiple terminals for a channel with the Quality of Service characteristics that matches the request. Based on the results of the query, the communications gateway (router) decides which modem matches the request and reserves the channel.

Referring to FIG. 1, the communications gateway 10 can include but is not limited to a SATCOM DIRECT ROUTER, such as the router for aircraft communications described in U.S. patent application Ser. No. 14/259,588 filed Apr. 23, 2014, now U.S. Pat. No. 9,553,658, to the same assignees as the subject patent application, which is incorporated by reference in its' entirety.

Communications System (Modems 1 to N, (labeled 12, 14 and 16) can include, but is not limited to Modems, such as an HSD 400 (High-speed Data and Voice Terminal) which can support simultaneous Inmarsat Swift 64 channels, HD 710 (stand alone satellite terminal), both by SATCOM DIRECT and SAT 2100 Satellite communication system, by Rockwell Collins, which is a Inmarsat satellite communications system that enables real-time information for passengers and crew, and operates multi-channel voice, facsimile and low-speed PC data capability. The SAT-2100 also enables up to two simultaneous Swift64 or Swift Broadband channels using its HST-2110B and HCM-2100B companions. The SAT-2100 incorporates a high-power amplifier (HPA), radio frequency unit (RFU) and satellite data unit (SDU) within a single 8 MCU package.

Referring to FIG. 1, application(s) 22, 24 and 26 can include the Global VT systems and methods, such as those described in copending U.S. patent application Ser. No. 14/885,678 filed Oct. 16, 2015, now U.S. Pat. No. 9,554,275, which claims the benefit of priority to U.S. Provisional Patent Application Ser. No. 62/065,742 filed Oct. 19, 2014, by the same assignee as the subject application which is incorporated by reference in its' entire, and allows for using personal smart phone numbers for sending and receiving calls and SMS (short message service) messaging from one's own phone number.

Features and benefits of the novel GlobalVT system include:

a. Available for aircraft having the SATCOM DIRECT ROUTER (SDR) and GlobalVT, passengers can use their smart phone numbers to text and talk anywhere in the world. The SDR can include the router for aircraft communications described in U.S. patent application Ser. No. 14/259,588 filed Apr. 23, 2014, now U.S. Pat. No. 9,553,658, to the same assignees as the subject patent application, which is incorporated by reference in its' entirety.

b. Unlimited, seamless calling between parties c. Availability through all phases of flight-take off to landing.

d. Use of the smart phone contact list for dialing and text messaging, including personalized ringtones and Caller ID settings without the need for additional applications.

e. In-flight messaging and calls are managed through the GlobalVT messaging App. (downloadable App. for the mobile device)

f. Service available over multiple satellite networks.

g. Works over Inmarsat Swift Broadband, Global Xpress/Jet ConnecX, ViaSat Yonder and Excede, and 3G/4G/LTE h. Over 300 roaming agreements in place to start i. Overcomes known problems associated with latencies providing the user clearer, crisper voice quality. No straining to hear through static, no faraway faint tinny voices for communications both ways between the caller and the mobile user.

In a preferred embodiment, the GlobalVT system 1 can utilize the SDR (Satcom Direct Router) to be the WiFi AP. The SDR can include invention described in U.S. patent application Ser. No. 14/259,588 filed Apr. 23, 2014, now U.S. Pat. No. 9,553,658, to the same assignee as the subject patent application, which is incorporated by reference in its' entirety.

The Satcom Direct Router (SDR) methods, systems, and devices in U.S. patent application Ser. No. 14/259,588 filed Apr. 23, 2014, now U.S. Pat. No. 9,553,658, incorporates various products described in U.S. patent applications, each assigned to Satcom Direct, Inc. the same assignee as this patent application. Specifically, the SDR incorporates the following inventions which are all incorporated by reference in their entirety:

U.S. Provisional Patent Application No. 61/889,183 filed on Oct. 10, 2013, now U.S. patent application Ser. No. 14/259,796 filed Apr. 23, 2014, now U.S. Pat. No. 9,577,742, by the same inventor and assignee of the subject invention, which is incorporated by reference in its' entirety, describes system and method for mobile ground-to-air and air-to-ground communication network acceleration. The system and method can reduce the cost of airborne communication services by creating a faster connection and thus increasing data throughput. In one embodiment, the communication network acceleration system and method provide as much as a four-fold increase over standard high-speed data rates. This increase is made possible in part through the integration, implementation, and use of acceleration and compression technologies in the ground system that supports communications to and from an airborne terminal.

U.S. Provisional Patent Application No. 61/888,574 filed on Oct. 9, 2013, filed as U.S. patent application Ser. No. 14/297,146, now U.S. Pat. No. 9,008,868, by the same inventor and assignee of the subject invention, which is incorporated by reference in its' entirety, describe methods and systems for use of a centrally managed, 'Cloud' based system that is responsible for management on onboard avionics equipment. Specifically, this invention relates to a system whereby an avionics device will communicate with a centrally location "Cloud" system for command and control of both predefined and arbitrary tasks or functions that the onboard avionics will perform.

U.S. Provisional Patent Application No. 61/888,593 filed Oct. 9, 2013, now U.S. patent application Ser. No. 14/317,173 filed Jun. 27, 2014, now U.S. Pat. No. 9,565,618. by the same inventor and assignee of the subject invention, describes methods and systems that can manage multiple different connection types for Air-to-Ground and Ground-to-Air communications, which is incorporated by reference in its' entirety. This system actively monitors the different connections types, and switches traffic to the highest priority functioning connection. Furthermore, it does this while maintaining the connections of Internet TCP/IP traffic that is passing through the system, allowing passenger or system traffic to remain connected.

U.S. Provisional Patent Application No. 61/888,600 filed Oct. 9, 2013, now U.S. patent application Ser. No. 14/309, 084 filed Jun. 19, 2014, now abandoned, by the same inventor and assignee of the subject invention, which is incorporated by reference in its' entirety, describes a capability which requires aircraft passengers who wish to use Internet Access while onboard on aircraft to watch a mandatory safety briefing video prior to being granted Internet access. During the use of personal electronics devices PED onboard an aircraft, the PEDS connect to an onboard wireless access point (WiFi). Either through onboard avionics equipment, or through a centrally managed ground based infrastructure, the passenger is required to watch a safety briefing video, with our without additional commercial or educations messages, before the PED is allowed access to the Internet. This is similar to many WiFi Hotspots' whereby the owner/operations of such require the viewing of advertisement or other communication content prior to being granted Internet access.

Figure 2:
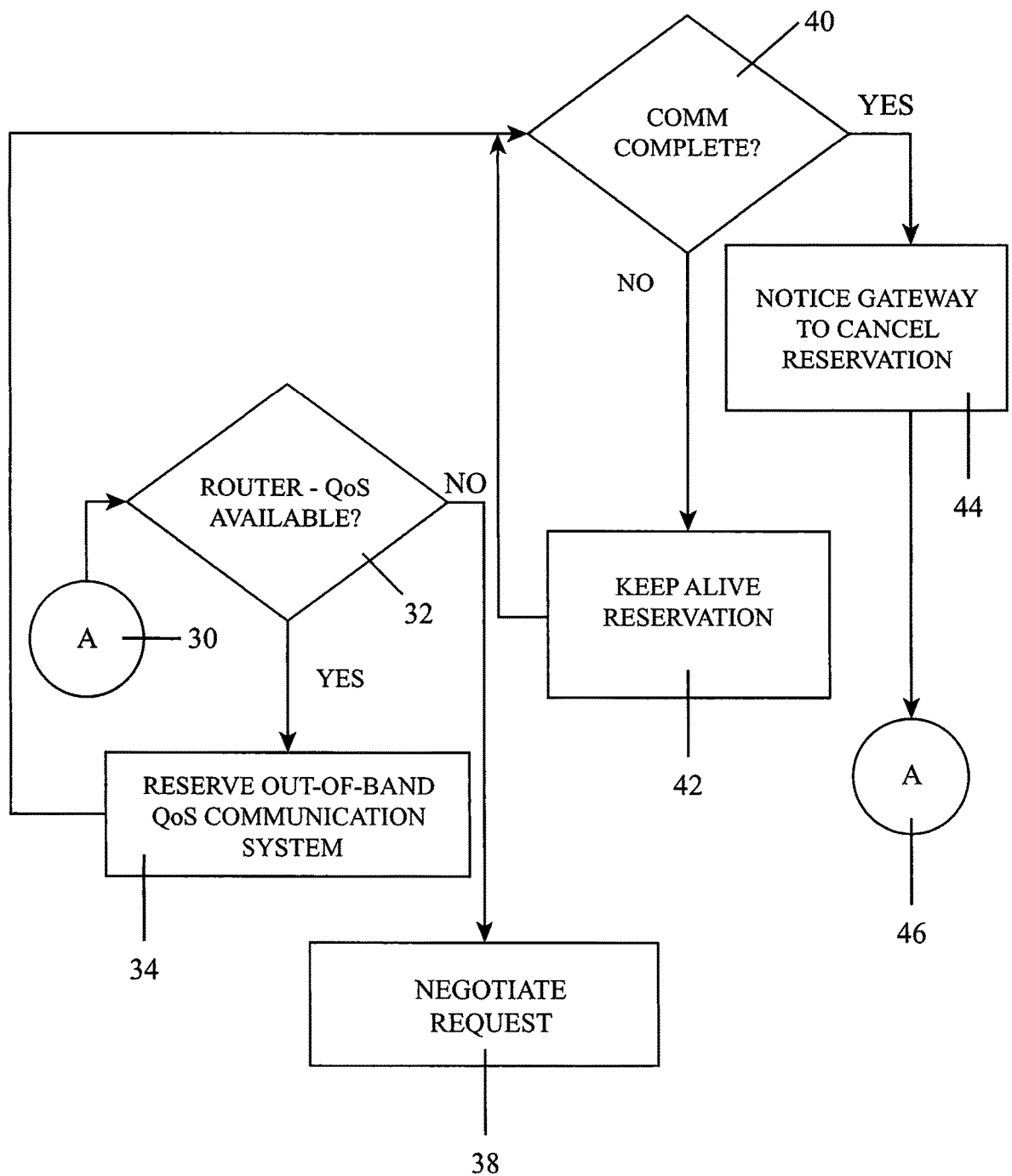
FIG. 2 is a process flow diagram showing the communication between requester, provider and other service providers to accomplish reservation.

FIG. 2 is a process flow diagram showing the communication between requester, communication gateway and other service providers to accomplish reservation. Once the communications have been concluded, the invention allows for the originating system to signal the communications gateway that the reserved connection is no longer required.

Referring to FIG. 2, a call 32 can be initiated from a device (smart phone, tablet, laptop computer, personal computer and the like) using the Application Programming Interface (API), which is a communication interface mechanism 30. The router 32 determines if QoS (the quality of service) is available through use of a selected profile detailing the capabilities of the communication system The router 34 requests QoS from an attached modem (such as but not limited to the HSD 400 (High-speed Data and Voice Terminal), HD 710 (stand alone satellite terminal), and SAT 2100 referenced above). For negotiate request 38, in this implementation, if QoS is not available (because we are connected to 3G for example) then we simply increment our call count. Alternatively, in the case where QoS service is available, but we have reached our max call setting we simply reject the request.

At 40, the device from which the call originates indicates the call is complete through use of a message defined in the API. At 42, the keep alive reservation is active between the device from which the call was initially placed and the router it is connected to. This mechanism is to ensure that the QoS reservation is not needlessly kept (for example in the event that the device from which the call originated crashes and did not terminate the call properly). At 44, the communication has completed which signals the router to cancel the QoS reservation.

Figure 3:
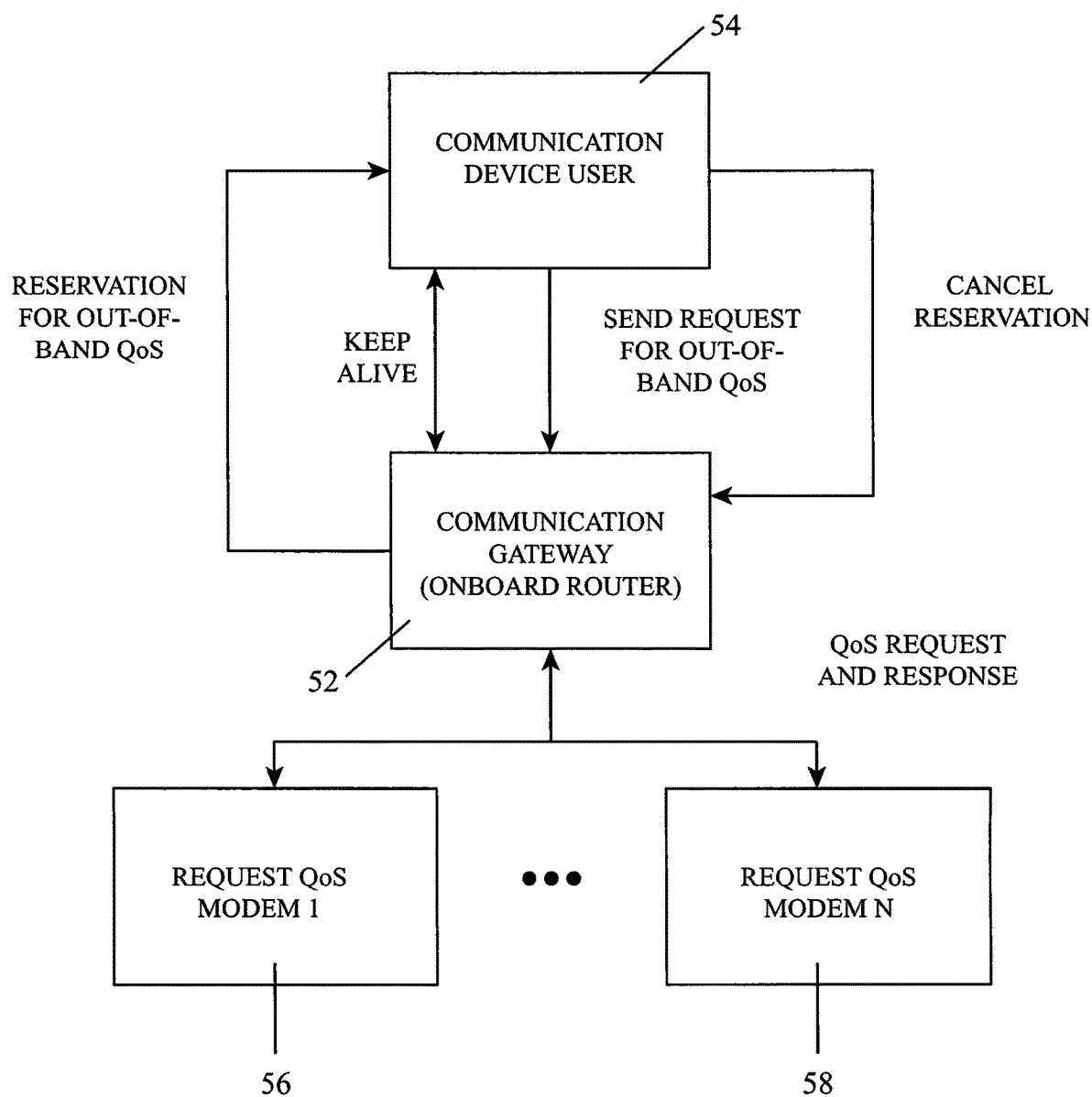
FIG. 3 is another block diagram of the Quality of Service Request System of FIG. 1 of the present invention.

FIG. 3 is another block diagram of the Quality of Service Request System of FIG. 1. As shown, the system also allows for the originating device to indicate that the requirement for the quality of service connection is still required by signaling periodic 'keep alive' messages between 52 and 54 so the communications gateway maintains the quality of service connection. These 'keep alive' messages also allow the system to shut down a communications channel if the requesting system or device fails, or goes offline for any reason.

Referring to FIG. 3, item 54 initially requests QoS out of band from Item 52. The Communication Gateway requests a channel from Item 56 and/or Item 58, which if successful returned the Reservation for out-of-band QoS to Item 54. Item 54 is then entitled to use the channel until such time as it sends the cancel reservation, or the keep alive between Item 54+Item 52 expires.

The system on the communications gateway is responsible for acquiring a connection meeting the quality of service requirements, which may involve communicating with one or more other communication systems (ie: as a proxy) to negotiate a connection meeting the requirement.

The present invention also publishes a set of Application Programming Interfaces (API's) that other systems or devices can use to communicate through this "out of band" system in order to reserve (RSVP) a network connection meeting the performance requirements.

An application of the novel invention will now be described in relation to a system overview, enhanced Voip Methodology and Application.

System Overview

The enhanced VoIP (evoip) (Voice Over Internet Protocol) application does the call management for global VT. The phone application communicates to the 'evoip' application via a defined API (Application Programming Interface). Managed (or enhanced) calls are calls that go over SBB (Swift Broadband). All other calls are considered non-managed (3G, Yonder etc). In the managed case, the evoip application interfaces with the SDU to bring up a secondary streaming context dedicated to voice RTP (Real-time Transport Protocol) traffic. Voice traffic is selected to go over the secondary by the use of port filtering (10000-20000). All other traffic goes over the background session. Call limits for each type of interface is pre-defined in the enhanced voip configuration file.

The enhanced VoIP implementation consists of the C++ evoip application along with a series of scripts that inform the app whether we are in a managed/non-managed state and whether a SBB connection is up or not. If SBB is connected it does not necessarily mean that calls will go over it, as GoIP (might have selected 3G and hence there is some complexity involved in keeping the evoip application updated with which state (managed/non-managed) we are currently in. GoIP refers to U.S. patent application Ser. No. 14/317,173 filed Jun. 27, 2014, for Air to Ground Management of Multiple Communication Paths, based on U.S. Provisional Patent Application Ser. No. 61/888,593 filed Oct. 9, 2013, now U.S. Pat. No. 9,565,618, which is incorporated by reference in its' entirety.

The EnhancedVoip Methodology

A dedicated pipe can be created carrying only the voice traffic. Every call consumes 16 kbit/s bandwidth, hence first call uses 16 kbit/s, second call uses 32 kbit/s, third call uses 48 kbit/s and fourth call uses 64 kbit/s. The maximum allowed number of calls over SBB is 4. However, with lower gain antennas the max allowed number of calls are 1 or 2. This call limit is defined in the enhanced voip configuration file and is tied to a specific profile.

When the initial call is added a few steps are required:
 1. A secondary needs to be defined.
 2. A traffic flow template needs to be applied. The purpose of this command is to ensure that the voice traffic goes over the secondary context.

3. Quality of Service needs to be applied. The purpose of this command is to define the bandwidth of the secondary context.
4. The secondary needs to be activated.

When a context is modified (subsequent add/remove calls):
1. Max calls check is performed.
2. The secondary is deactivated.
3. If the number of requested calls is >0 then:
   1. The new QoS profile is applied.
   2. The secondary is activated.

Although commands exist to modify an existing context (without tearing it down first), it was found in testing that this method was not reliable and one way voice was a common problem seen. Therefore, for every call add/remove operation the secondary is deactivated and reactivated.

Evoip Application
Interface Between Phone Application and Evoip

A UDP (User Datagram Protocol) connection is created between the phone application and evoip. The default port used is 19011 (this value is configurable). Through the use of a public API (written in JSON format) the phone application is able to add/remove calls and query for status. Since the evoip application depends on receiving a 'remove call' message from the phone app to tear down the call, a mechanism needs to be present whereby the call can be torn down if connectivity with the app is lost (maybe the phone app crashes etc). Since the streaming contexts can be very expensive we have to ensure that these connections are not needlessly kept up. A heartbeat mechanism has been implemented between the phone app and evoip app. The evoip app expects a ping message every 20 seconds and responds with an OK upon receipt of a ping. Every two minutes the number of missed ping messages are checked; if the number of missed pings exceeds 3 for a particular client then all calls associated with that client are removed. Generally, only one call with be associated with a client, but support for multiple calls per client has been implemented.

Interface Between Evoip and SDU

A TCP connection can be created between the evoip application and the SDU. The port and IP is SDU (Satellite Data Unit) dependent and the default port & IP for the various SDU's are stored in the enhanced voip configuration file. The user has the ability to modify these parameters from the GUI. When an action is to be performed (add call for example) the connection is opened, the appropriate commands are executed and the connection is closed. The evoip application configures and attaches a secondary context through the use of AT commands.

Context Definition/Modification/Activation Flow

Figure 4A:
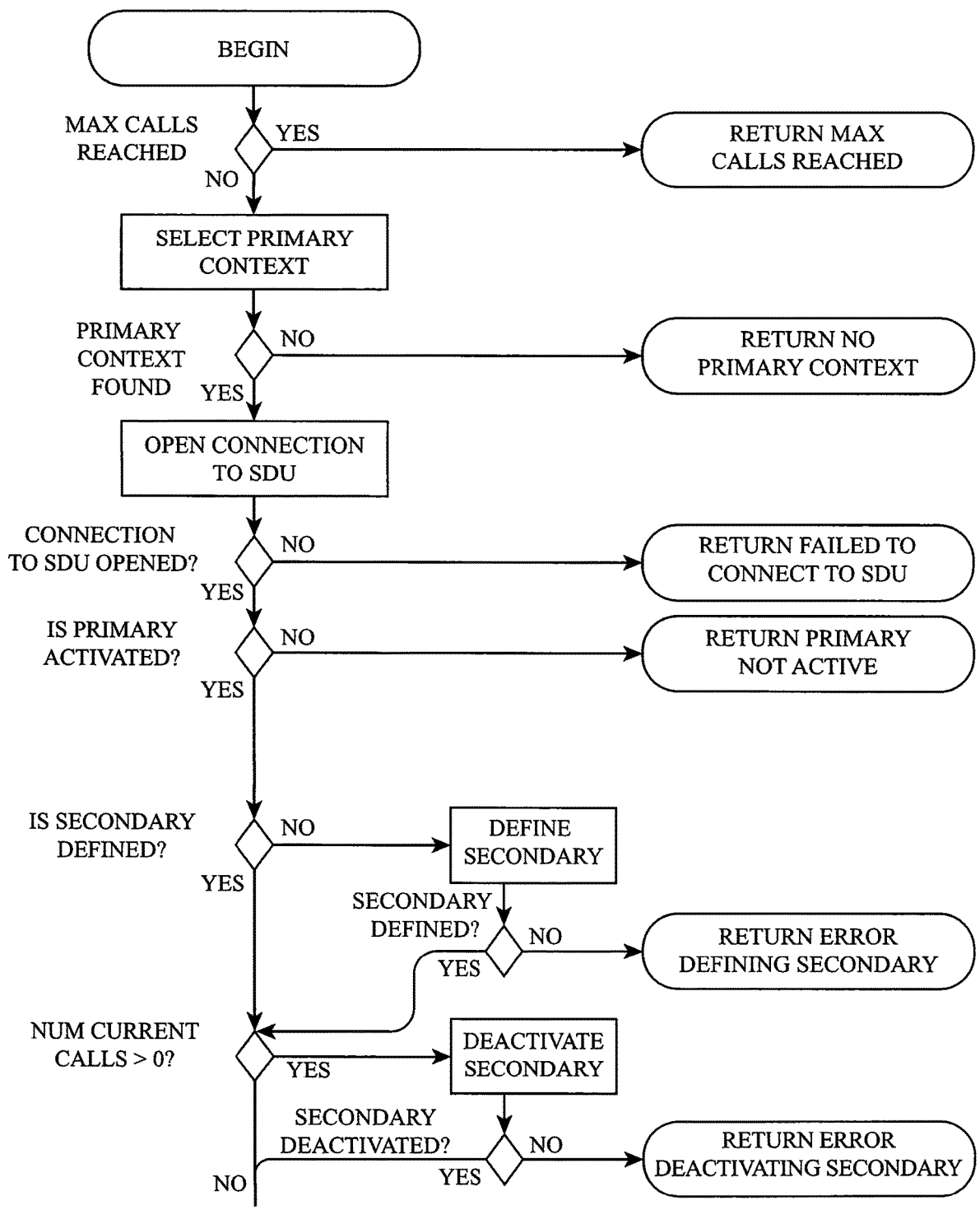
FIGS. 4A-4B shows a flowchart of adding and removing calls with the novel invention.
Figure 4B:
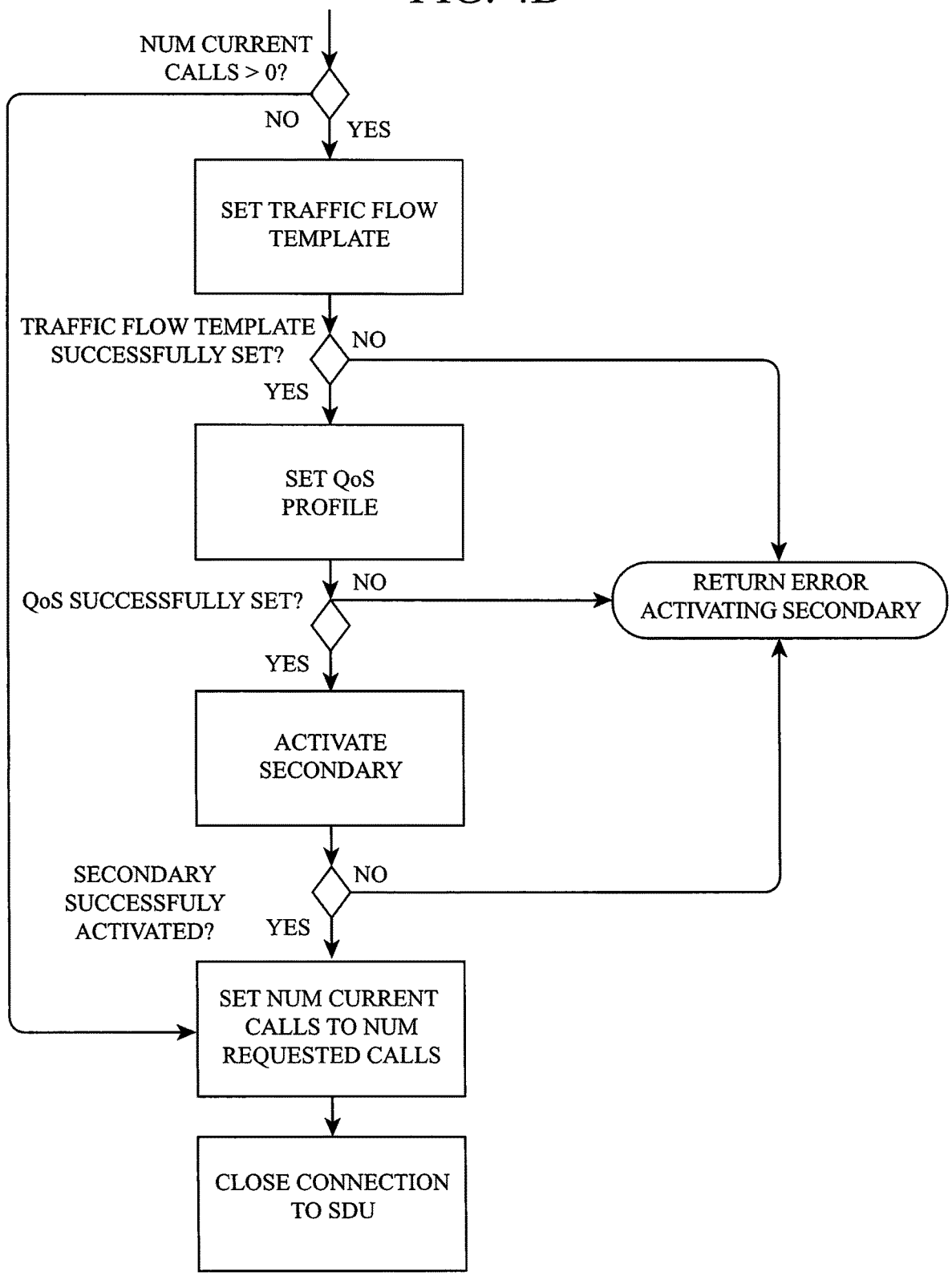

FIGS. 4A and 4B, describes the core process of adding and removing calls. These operations requires a secondary context to be defined and the proper QoS template to be applied (depending on the number of calls) and then activating the context. The code that implements this logic resides in the setNumCalls( ) method of the AT class.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A wireless communication bandwidth allocation management system coupled to a plurality of communication systems, comprising:

at least one user requestor device onboard an aircraft having a mobile application for requesting, via out-of-band communications, a channel having desired Quality of Service (QoS) data transfer rate characteristics over said plurality of communication systems; and a communication gateway comprising an onboard aircraft Quality of Service router, the communication gateway configured to:

receive said request from said at least one user requestor device, via out-of-band communications, for reservation of a channel having the desired QoS data transfer rate characteristics;

query the plurality of communication systems for a channel that has the desired Quality of Service data transfer rate characteristics matching the request;

determine if the requested channel having the desired Quality of Service data transfer rate characteristics is available to the at least one user requestor device through at least one of said plurality of communication systems;

negotiate with at least one of said plurality of communication systems to acquire a connection with one of the plurality of communication systems for the requested channel having the desired Quality of Service data transfer rate characteristics;

reserve the requested channel having the desired Quality of Service data transfer rate characteristics for the at least one user requestor device from one of said plurality of communication systems when the requested channel having the desired Quality of Service data transfer rate characteristics becomes available;

signaling periodic keep alive messages between the communication gateway and the at least one user requestor device to maintain the channel having the desired QoS data transfer rate characteristics, and terminate the reservation of the channel having desired Quality of Service data transfer rate characteristics when the at least one user requestor device notifies the communication gateway that the desired channel having Quality of Service data transfer rate characteristics is no longer needed.

2. The communication bandwidth allocation management system of claim 1, wherein said plurality of communication systems includes a plurality of modems in communication with the onboard aircraft QoS router, and wherein the communication gateway selects a modem among the plurality of modems, which matches the desired QoS data transfer rate characteristics for the requested channel, and reserves a communication channel characterized by the desired QoS data transfer rate characteristics with the selected modem.

3. The communication bandwidth allocation management system of claim 2, wherein the modems support up to two simultaneous channels.

4. The communication bandwidth allocation management system of claim 3, wherein the onboard aircraft QoS router includes QoS/Prioritization to locate bandwidth per user requestor device and to prevent a single device from consuming all available bandwidth as well as prioritizing traffic for a connection.

5. The communication bandwidth allocation management system of claim 2, wherein periodic keep alive messages are signaled between the user requestor device and the communication gateway to maintain a QoS connection between the user requestor device and the selected modem, and wherein the reserved communication channel is shut down for the user requestor device if the requestor device fails, goes offline or the reserved communication channel is canceled.

6. The communication bandwidth allocation management system of claim 1, wherein the at least one user requestor device is selected from one or more of a group consisting of a smart phone, a tablet, a laptop computer and a personal computer.

7. The communication bandwidth allocation management system of claim 1, wherein the communication gateway is further configured to provide a proxy between the at least one user requestor device and at least one of said plurality of communication systems with which the requested bandwidth is available.

8. A method of managing a wireless communication bandwidth allocation, comprising:
   providing a communication gateway including a router onboard an aircraft, wherein the communication gateway is coupled to a plurality of communication systems;
   providing at least one portable user requestor device onboard an aircraft having a mobile application for requesting, via an out-of-band communications, a channel having desired Quality of Service data transfer rate characteristics for communications over one or more of said plurality of communication systems;
   requesting the channel having desired Quality of Service data transfer rate characteristics with the communication gateway by the at least one portable user requestor device;
   querying said plurality of communication systems for a channel with Quality of Service data transfer rate characteristics that matches the requested desired Quality of Service data transfer rate characteristics;
   determining if the requested channel having desired Quality of Service data transfer rate characteristics is available through at least one of said plurality of communication systems by the communication gateway;
   negotiating with at least one of said plurality of communication systems for the requested channel having desired Quality of Service data transfer rate characteristics with the communication gateway to acquire a connection with one of said plurality of communication systems;
   reserving the requested channel having desired Quality of Service data transfer rate characteristics for the at least one portable user requestor device with the communication gateway from one of the said plurality of communication systems when the requested channel having the desired Quality of Service data transfer rate characteristics becomes available;
   signaling periodic keep alive messages between the communication gateway and the at least one portable user requestor device to maintain the desired Quality of Service data transfer rate characteristics; and
   terminating the reservation of the channel having desired Quality of Service data transfer rate characteristics with the communication gateway when the at least one portable user requestor device notifies the communication gateway that the channel having desired Quality of Service data transfer rate characteristics is no longer needed.

9. The method of claim 8, further comprising:
   providing a communication link between the communication gateway and one of said plurality of communication systems, wherein said plurality of communication systems include a plurality of modems onboard the aircraft; and
   selecting with the communication gateway a modem among the plurality of modems, which matches the requested data transfer rate for the channel having the desired Quality of Service data transfer rate characteristics and reserving a communication channel having the requested desired Quality of Service data transfer rate characteristics with the selected modem.

10. The method of claim 9, wherein the modems support up to two simultaneous channels.

11. The method of claim 10, wherein the router onboard the aircraft includes QoS/Prioritization to locate bandwidth per user requestor device and to prevent a single device from consuming all available bandwidth as well as prioritizing traffic for a connection.

12. The method of claim 9, further comprising:
   periodically signaling keep alive messages between the user requestor device and the communication gateway to maintain a quality of service connection between the user requestor device and the selected modem; and
   shutting down the reserved communication channel for the user requestor device if the requestor device fails, goes offline or the reserved communication channel is canceled.

13. The method of claim 8, wherein the at least one portable user requestor device is selected from one or more of a group consisting of a smart phone, a tablet, a laptop computer and a personal computer.

14. The method of claim 8, further comprising providing a proxy between the at least one portable user requestor device and at least one of said plurality of communication systems.

* * * * *